J. PAUPA.
TREE PROTECTOR.
APPLICATION FILED SEPT. 20, 1920.
1,420,738.
Patented June 27, 1922.
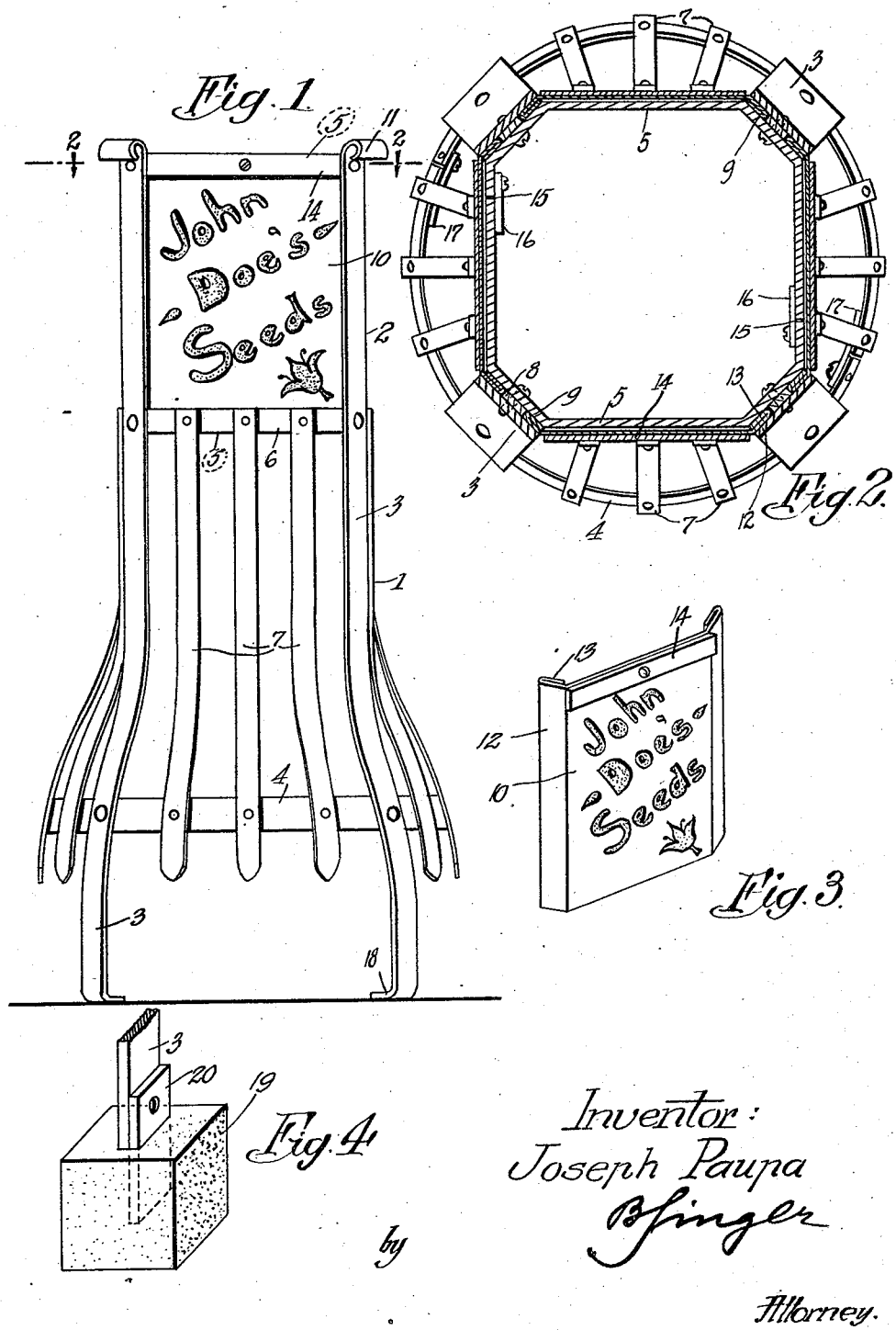
Inventor:
Joseph Paupa
by

UNITED STATES PATENT OFFICE.

JOSEPH PAUPA, OF CHICAGO, ILLINOIS.

TREE PROTECTOR.

1,420,738.  Specification of Letters Patent.  Patented June 27, 1922.

Application filed September 20, 1920. Serial No. 411,618.

*To all whom it may concern:*

Be it known that I, JOSEPH PAUPA, a citizen of the United States, residing at Chicago, 3153 Broadway, in the county of Cook and State of Illinois, have invented a new and useful Improvement in Tree Protectors, of which the following is a specification.

The invention relates to improvements in tree protectors.

An object of the invention is to provide a tree protector which can readily be assembled about a tree and which does not interfere with the growth of the tree, but guards the same against the impact of heavy objects or animals.

Another object is to devise a tree protector provided with surfaces suitable for receiving imprints, posters or for displaying ornamental matter.

It is furthermore an object of the invention to create a tree protector in which plates or slides adapted to display printed or ornamental surfaces can be inserted and from which they can easily be removed to be exchanged for other similar carriers of printed or ornamental matter.

With these and other objects in view embodiments of the invention are described in the following specification, and are illustrated in the accompanying drawing.

In the drawing,

Fig. 1 is a side elevation of the device;

Fig. 2 is a horizontal section on line 2—2 of Fig. 1.

Fig. 3 is a perspective view of an exchangeable slide, and

Fig. 4 is a perspective view of a modified form of anchorage for the protector.

The protector consists in the main of a fence or basket portion 1 and a display portion 2, preferably arranged above the same. Four corner posts or uprights 3 are suitably spaced apart by being secured near the lower end to a spacing ring 4 and near the upper portion to substantially quadrilateral frames 5. As the ring 4 is circular the general cross section of the protector changes from the upper to the lower portion and owing to this fact and to the outward sweep of the upright near the lower end the appearance of the device is greatly improved over that of the ordinary wire woven conical or cylindrical tree protector, and no sharp corners are presented on that part against which children, animals or objects might impact. The uprights 3 are secured to the ring 4 and to the frames 5 by rivets or the like, the corners of the frames 5 being shaped to accommodate the uprights thereon. Flat bars 7 are secured to bars 6 and to the ring 4 and are flared outwardly like the corner posts to complete the lower portion or basket of the protector. The bars 6 are parallel to and united with the sides of the lower frame 5.

The upper parts of the uprights 3 are not secured directly upon the flattened corner portions of the frame, but narrow strips 8 are interposed between these parts, whereby narrow grooves 9 are provided at both sides of these strips between the flattened corners and the uprights. The strips 8 also serve for materially reinforcing the upper portion 2 of the structure.

The grooves 9 serve for slidably receiving and for retaining plates 10 on which suitable advertising matter, information of other character, or decorative imprints may be displayed. The convolutions 11 at the top of the uprights 3 and the flaring "open work" portions of the basket combined with decorative imprints on the panels 10 combine to give the entire structure a pleasing appearance.

The plates or panels 10 have their longitudinal margins 12 bent at suitable angle to permit introduction into the grooves 9 and these margins preferably are strengthened by folding the material upon itself as indicated at 13 in Fig. 3. At the top the panel may be reinforced by a flat bar 14 which also will facilitate the insertion or exchange of the panel.

To permit of the assembly of the structure about the trunk of a tree the frames 5 are each composed of two similar halfsections, abutting against each other at approximately diagonally opposite points 15. They are held in assembled relation by plates 16 secured to one halfsection by welding or the like and fastened on the companion section by screws or some other fastening means. In a very similar way the lower ring 3 also is composed of two halfsections which are united by plates 17 and by screws, the joints of the ring 4 and of the frames 15 being preferably located on a common plane.

The uprights have at the lower end inwardly directed lugs 18, preferably provided with holes (not shown) whereby they can be spiked to the ground, or they may be bolted to concrete blocks 19 from which short upright bars 20 project, the lower ends of the bars being imbedded in the concrete.

I claim:

1. As a new article of manufacture a tree protector comprising corner posts spaced on their lower portions by a circular member, horizontal bars associated with the upper portions of the corner posts, and panels slidably guided by said upper portions of the corner posts and the horizontal bars.

2. As a new article of manufacture, a tree protector comprising corner posts, rectangular frames having bevelled corners, the posts being secured to the bevelled corners of the frames, the frames being spaced vertically from each other, and being spaced from the posts, and panels slidably guided between said frames and posts.

3. As a new article of manufacture a tree protector having corner posts, frames, the frames consisting each of several parts adapted to be brought into abutment to supplement each other into a closed frame, bars interposed between said frames and posts adapted to hold said frames spaced from said posts, and panels guided in the spaces between the frames and posts.

4. As a new article of manufacture, a tree protector having corner posts, spaced near their lower part by a circular ring composed of two equal parts abutting against each other at diametrically opposite points, frames vertically spaced from each other and spaced from the upper parts of the corner posts united therewith, each of the frames composed of equal parts abutting against each other at diagonally opposite points, means for uniting the parts of the circular ring, means for uniting the parts of the frames, the joints between the parts of the frames, and the joints between the parts of the circular ring being approximately in one vertical plane, and panels slidably held between said posts and said frames.

5. A tree protector comprising corner posts, frames spaced therefrom and united therewith, and panels having flange portions slidably fitting into the space between the posts and frames.

In witness whereof I affix my signature.

JOSEPH PAUPA.